(12) United States Patent
Somekawa

(10) Patent No.: US 9,020,500 B2
(45) Date of Patent: Apr. 28, 2015

(54) NETWORK SELECTION IN A MOBILE COMMUNICATION TERMINAL

(75) Inventor: Kousuke Somekawa, Kanagawa (JP)

(73) Assignee: NEC Casio Mobile Communications Ltd., Kanagawa (JP)

( * ) Notice: Subject to any disclaimer, the term of this patent is extended or adjusted under 35 U.S.C. 154(b) by 18 days.

(21) Appl. No.: 13/882,310

(22) PCT Filed: Sep. 22, 2011

(86) PCT No.: PCT/JP2011/071584
§ 371 (c)(1),
(2), (4) Date: Apr. 29, 2013

(87) PCT Pub. No.: WO2012/060165
PCT Pub. Date: May 10, 2012

(65) Prior Publication Data
US 2013/0225162 A1    Aug. 29, 2013

(30) Foreign Application Priority Data
Nov. 5, 2010    (JP) ................................. 2010-248792

(51) Int. Cl.
| | | |
|---|---|---|
| H04W 4/00 | (2009.01) | |
| H04W 8/02 | (2009.01) | |
| H04W 8/18 | (2009.01) | |
| H04M 1/725 | (2006.01) | |
| H04W 48/16 | (2009.01) | |
| H04W 8/12 | (2009.01) | |

(52) U.S. Cl.
CPC ............ *H04W 8/02* (2013.01); *H04M 1/72583* (2013.01); *H04W 8/183* (2013.01); *H04W 48/16* (2013.01); *H04W 8/12* (2013.01)

(58) Field of Classification Search
USPC .............. 455/432.1, 432.3, 434, 435.2, 422.1
See application file for complete search history.

(56) References Cited

U.S. PATENT DOCUMENTS

| | | | |
|---|---|---|---|
| 7,433,929 B2 * | 10/2008 | Guilford et al. .............. | 709/217 |
| 2002/0087674 A1 | 7/2002 | Guilford et al. | |
| 2002/0123340 A1 | 9/2002 | Park | |

(Continued)

FOREIGN PATENT DOCUMENTS

| | | |
|---|---|---|
| CN | 1274175 C | 9/2006 |
| CN | 1894982 A | 1/2007 |

(Continued)

OTHER PUBLICATIONS

Communication dated Apr. 7, 2014, issued by the European Patent Office in corresponding Application No. 11837818.1.

(Continued)

*Primary Examiner* — Brandon Miller
(74) *Attorney, Agent, or Firm* — Sughrue Mion, PLLC

(57) ABSTRACT

A contract operator information acquisition section (110) acquires contract network operator identification information and availability/unavailability information from a service operator with which a mobile communication terminal (100) has a communication contract; an operator search section (130) searches for network operators; a comparison section (140) compares network operator identification information about the retrieved network operators with contract network operator identification information based on which the availability/unavailability information shows "available", from among the acquired contract network operator identification information; and a display section (150) displays matching network operator identification information as a result of the comparison.

5 Claims, 7 Drawing Sheets

(56) References Cited

U.S. PATENT DOCUMENTS

| | | |
|---|---|---|
| 2004/0147280 A1 | 7/2004 | Kamiya |
| 2005/0130661 A1* | 6/2005 | Aerrabotu et al. ............ 455/437 |
| 2006/0034259 A1 | 2/2006 | Matsuda |
| 2006/0097048 A1* | 5/2006 | Mori .............................. 235/439 |
| 2010/0022241 A1 | 1/2010 | Hokao |
| 2010/0262682 A1* | 10/2010 | Dunn et al. ................... 709/221 |
| 2011/0003590 A1* | 1/2011 | Yoon et al. ................. 455/432.1 |

FOREIGN PATENT DOCUMENTS

| | | |
|---|---|---|
| JP | 2002-135363 A | 5/2002 |
| JP | 2002-218522 A | 8/2002 |
| JP | 2004-127187 A | 4/2004 |
| JP | 2006-54535 A | 2/2006 |
| JP | 2009-290317 A | 12/2009 |
| JP | 2010-34640 A | 2/2010 |
| WO | 02/076117 A2 | 9/2002 |
| WO | 2006/111176 A1 | 10/2006 |
| WO | 2008/013291 A1 | 1/2008 |

OTHER PUBLICATIONS

Communication dated Oct. 21, 2014 issued by the State Intellectual Property Office of People's Republic of China in corresponding Application No. 201180053167.9.

* cited by examiner

Fig.1

| LIST OF NETWORK OPERATORS | |
|---|---|
| NETWORK OPERATOR A | UMTS |
| NETWORK OPERATOR B | UMTS |
| NETWORK OPERATOR C | GSM |
| NETWORK OPERATOR D | UMTS |
| NETWORK OPERATOR E | GSM |
| NETWORK OPERATOR F | GSM |
| NETWORK OPERATOR G | GSM |
| NETWORK OPERATOR H | UMTS |
| NETWORK OPERATOR I | GSM |

Fig.4

| CONTRACT NETWORK OPERATOR IDENTIFICATION INFORMATION | AVAILABILITY/ UNAVAILABILITY INFORMATION |
|---|---|
| NETWORK OPERATOR A | AVAILABLE |
| NETWORK OPERATOR D | UNAVAILABLE |
| NETWORK OPERATOR E | AVAILABLE |
| NETWORK OPERATOR F | AVAILABLE |
| NETWORK OPERATOR G | UNAVAILABLE |
| NETWORK OPERATOR I | AVAILABLE |

Fig.6

```
          LIST OF NETWORK OPERATORS
    ----------------------------------------------

NETWORK OPERATOR A        UMTS

NETWORK OPERATOR E        GSM

NETWORK OPERATOR F        GSM

NETWORK OPERATOR I        GSM
```

Fig.7

| LIST OF NETWORK OPERATORS | | |
|---|---|---|
| NETWORK OPERATOR A | UMTS | AVAILABLE |
| NETWORK OPERATOR D | UMTS | UNAVAILABLE |
| NETWORK OPERATOR E | GSM | AVAILABLE |
| NETWORK OPERATOR F | GSM | AVAILABLE |
| NETWORK OPERATOR G | GSM | UNAVAILABLE |
| NETWORK OPERATOR I | GSM | AVAILABLE |

NETWORK SELECTION IN A MOBILE COMMUNICATION TERMINAL

CROSS REFERENCE TO RELATED APPLICATIONS

This application is a National Stage of International Application No. PCT/JP2011/071584, filed on Sep. 22, 2011, which claims priority from Japanese Patent Application No. 2010-248792, filed on Nov. 5, 2010, the contents of all of which are incorporated herein by reference in their entirety.

TECHNICAL FIELD

The present invention relates to a mobile communication terminal that displays a network with which a location can be registered, a network display method and a program.

BACKGROUND ART

A network selection method for a mobile communication terminal to select a network to be connected to the mobile communication terminal is prescribed as a "manual network selection method" by 3GPP (3rd Generation Partnership Project".

The network selection function prescribed here is such that the mobile communication terminal searches for surrounding network operators from which the mobile communication terminal can enjoy services, and displays all the retrieved network operators as a list on a screen provided on the mobile communication terminal. Then, the function is completed by the user selecting a desired network operator from among the network operators in the displayed list (for example, see Patent Literature 1).

FIG. 1 is a diagram showing an example of the list of the network operators displayed on the mobile communication terminal in the technique as described above.

As shown in FIG. 1, network operator identification information showing the network operators retrieved by the mobile communication terminal is displayed as a list.

In the example shown in FIG. 1, network operators A to I which are the network operator identification information showing the retrieved network operators are displayed being associated with radio connection technologies (RAT: Radio Access Technologies), respectively. The radio connection technologies displayed here are UMTS (Universal Mobile Telecommunications System), GSM (Global System for Mobile Communications) and the like.

CITATION LIST

Patent Literature

Patent Literature 1: Pamphlet of International Publication No. WO2008/013291

SUMMARY OF INVENTION

Technical Problem

In the technique described above, identification information about all retrieved network operators is displayed.

That is, even identification information regarding network operators that do not have a roaming contract with a network operator with whom the user of the mobile communication terminal has a communication contract (hereinafter referred to as a service operator) is displayed.

Here, from among the displayed network operators, the user cannot identify the network operator who has a roaming contract with the service operator. Therefore, there is a possibility that the user will select identification information about a network operator who does not have a roaming contract. Then, the user cannot perform location registration of the mobile communication terminal, and he has to select another network operator again. This leads to a problem in which the user is forced to waste time performing the same task.

Furthermore, identification information regarding a network operator, that is not available because of the occurrence of a fault which causes an operation failure or the like, is also displayed. In this case, even if the user selects identification information about a network operator who has a roaming contract with a service operator, the user similarly cannot perform location registration of the mobile communication terminal if the selected network operator is unavailable. Therefore, the user has to select another network again, and this leads to a problem in which the user is forced to waste time performing the same task.

The object of the present invention is to provide a mobile communication terminal, a network display method and a program that solve the problem described above.

Solution to Problem

A mobile communication terminal of the present invention is a mobile communication terminal comprising:

a contract operator information acquisition section that acquires, from a service operator with whom the mobile communication terminal has a communication contract, contract network operator identification information showing contract network operators that are network operators with whom the service operator has a roaming contract and availability/unavailability information showing whether or not the contract network operators are available;

an operator search section that searches for the network operators;

a comparison section that compares network operator identification information showing the network operators retrieved by said operator search section with contract network operator identification information based on which the availability/unavailability information shows "available", from among the contract network operator identification information acquired by said contract operator information acquisition section; and a display section that displays matching network operator identification information as a result of the comparison by said comparison section.

A network display method of the present invention is a network display method for displaying a network with which a mobile communication terminal is capable of registering a location, the method comprising the steps of:

acquiring, from a service operator with whom the mobile communication terminal has a communication contract, contract network operator identification information showing contract network operators who are network operators with whom the service operator has a roaming contract and availability/unavailability information showing whether or not the contract network operators are available;

searching for the network operators;

comparing network operator identification information showing the retrieved network operators with contract network operator identification information based on which the availability/unavailability information shows "available", from among the acquired contract network operator identification information; and displaying matching network operator identification information as a result of the comparison.

A program of the present invention is a program for causing a mobile communication terminal to execute the steps of:

acquiring, from a service operator with whom the mobile communication terminal has a communication contract, contract network operator identification information showing contract network operators who are network operators with whom the service operator has a roaming contract and availability/unavailability information showing whether or not the contract network operators are available;

searching for the network operators;

comparing network operator identification information showing the retrieved network operators with contract network operator identification information based on which the availability/unavailability information shows "available", from among the acquired contract network operator identification information; and displaying matching network operator identification information as a result of the comparison.

Advantageous Effect of Invention

As described above, in the present invention, it is possible to display network operator information such that the user is able to avoid selecting a network operator who does not have a roaming contact with the service operator.

BRIEF DESCRIPTION OF DRAWINGS

FIG. 1 is a diagram showing an example of a network operators list displayed on a mobile communication terminal in a technique as described above.

FIG. 4 is a diagram showing an example of association between contract network operator identification information and availability/unavailability information stored in a storage section shown in FIG. 3.

FIG. 6 is a diagram showing an example of a list displayed on a display section shown in FIG. 3 at step 9.

FIG. 7 is a diagram showing another example of the list displayed on the display section shown in FIG. 3 at step 9.

DESCRIPTION OF EMBODIMENT

An exemplary embodiment will be described below with reference to drawings.

Figure 2:
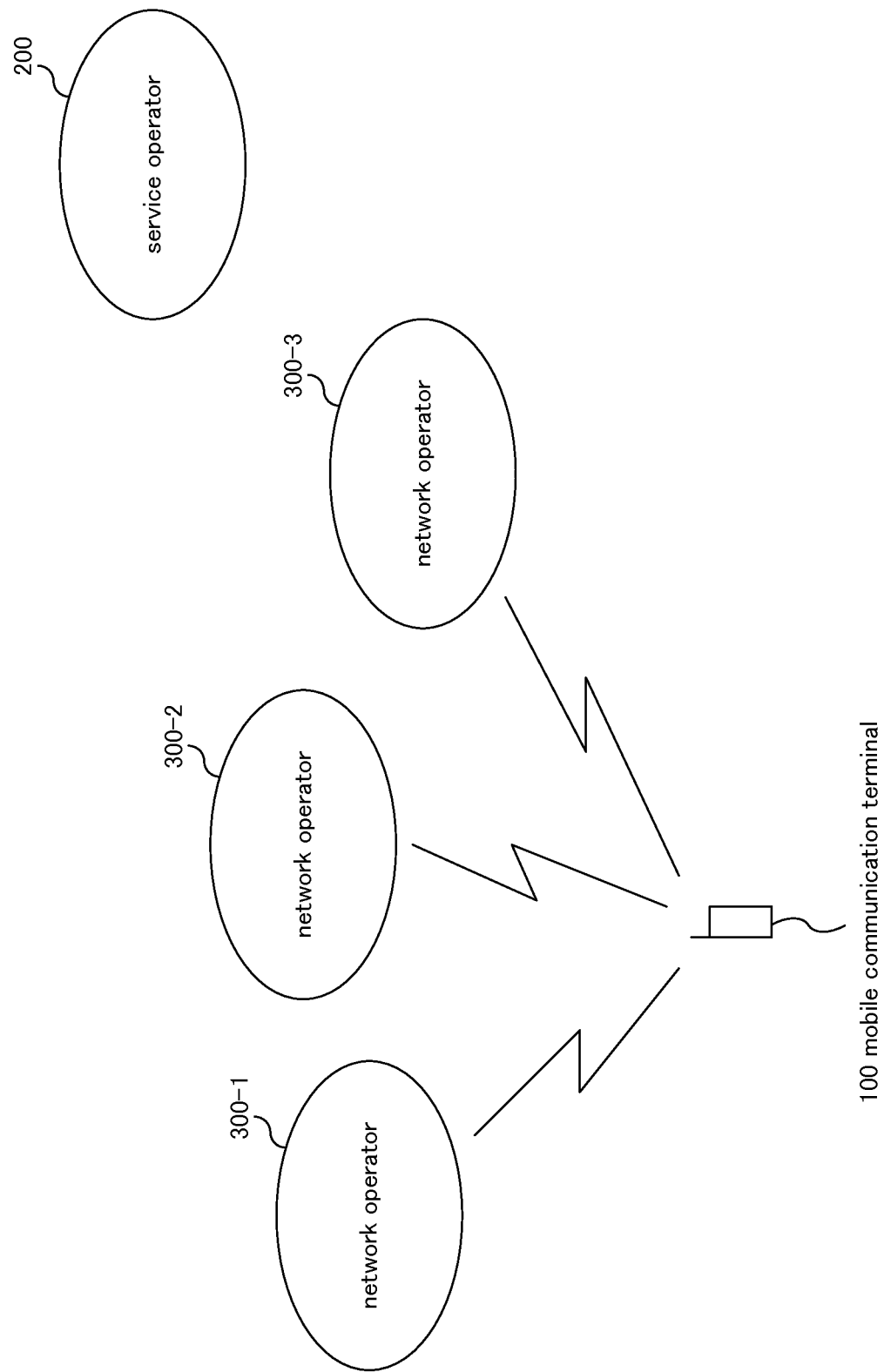
FIG. 2 is a diagram showing an exemplary embodiment of a communication system to which the mobile communication terminal of the present invention is connected.

FIG. 2 is a diagram showing an exemplary embodiment of a communication system to which a mobile communication terminal of the present invention is connected.

As shown in FIG. 2, the present exemplary embodiment is configured by mobile communication terminal 100, service operator 200 and network operators 300-1 to 300-3.

Service operator 200 is an operator with which mobile communication terminal 100 has a communication contract. Service operator 200 has contract network operator identification information showing contract network operators that are network operators having a roaming contract with service operator 200 and availability/unavailability information showing whether or not each of the contract network operators is available. Here, the contract network operator identification information is information which can identify a contract network operator and which is uniquely given to the contract network operator in advance.

Network operators 300-1 to 300-3 are operators covering the communicable range of mobile communication terminal 100.

Mobile communication terminal 100 is a movable communication terminal provided with a radio communication function.

Figure 3:
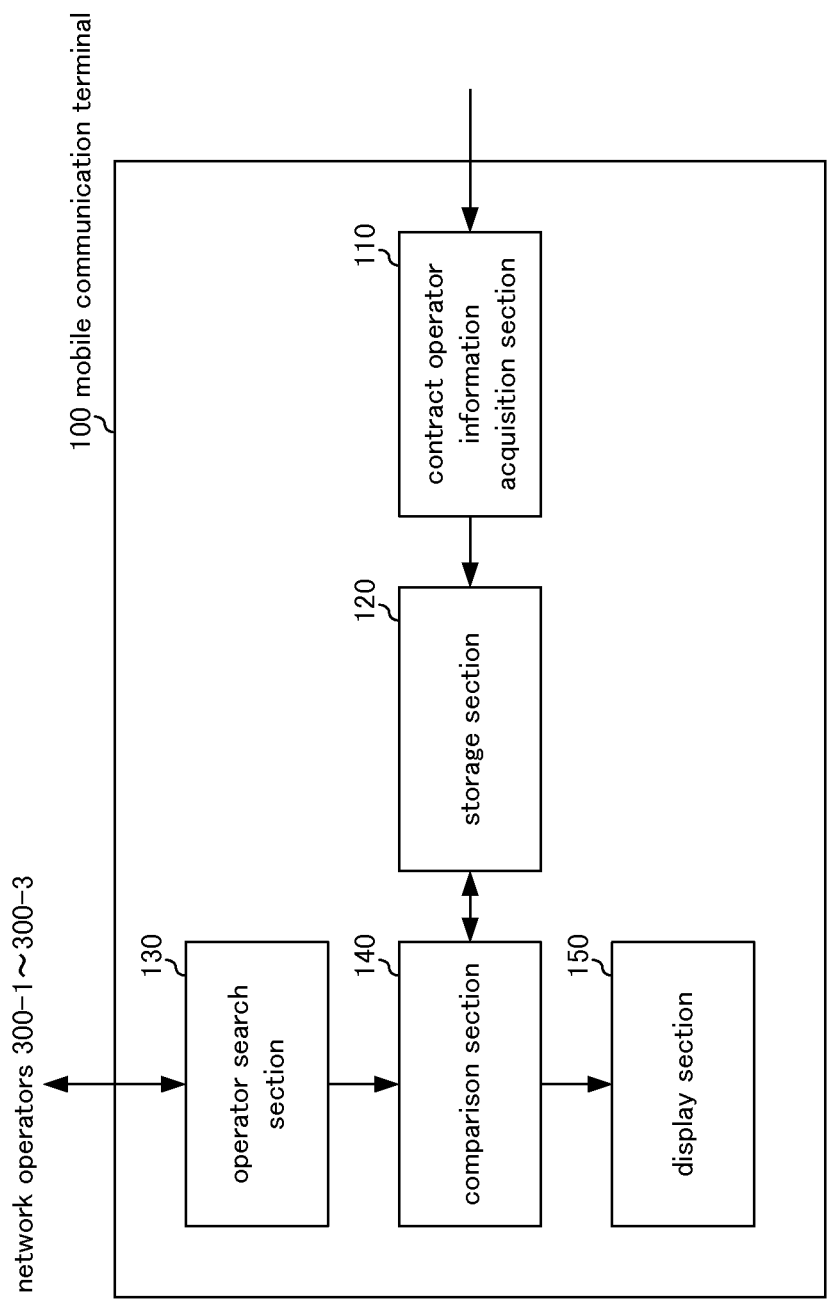
FIG. 3 is a diagram showing an example of an internal configuration of the mobile communication terminal shown in FIG. 2.

FIG. 3 is a diagram showing an example of an internal configuration of mobile communication terminal 100 shown in FIG. 2.

As shown in FIG. 3, mobile communication terminal 100 shown in FIG. 2 is provided with contract operator information acquisition section 110, storage section 120, operator search section 130, comparison section 140 and display section 150. FIG. 3 shows only components related to the present invention from among components provided for mobile communication terminal 100 shown in FIG. 2.

Contract operator information acquisition section 110 acquires, from service operator 200 with whom mobile communication terminal 100 has a communication contract, the contract network operator identification information showing contract network operators who are network operators having a roaming contract with service operator 200 and the availability/unavailability information showing whether or not the contract network operators are available. Contract operator information acquisition section 110 may periodically acquire the contract network operator identification information and the availability/unavailability information from service operator 200. Contract operator information acquisition section 110 may acquire the contract network operator identification information and the availability/unavailability information from the Web page of service operator 200. Contract operator information acquisition section 110 may acquire the contract network operator identification information and the availability/unavailability information from a predetermined communication apparatus using a contactless IC card function.

Storage section 120 is a memory that stores the contract network operator identification information and the availability/unavailability information acquired by contract operator information acquisition section 110, such that the contract network operator identification information and the availability/unavailability information are associated with each other.

FIG. 4 is a diagram showing an example of association between the contract network operator identification information and the availability/unavailability information stored in storage section 120 shown in FIG. 3.

As shown in FIG. 4, the contract network operator identification information and the availability/unavailability information, that are associated with each other, are stored in storage section 120 shown in FIG. 3.

The contract network operator identification information is the contract network operator identification information acquired by contract operator information acquisition section 110.

The availability/unavailability information is information showing whether or not a contract network operator who is given contract network operator identification information associated with the availability/unavailability information is currently available. The information shows "available" if the contract network operator is in a state of being normally available and shows "unavailable" if the contract network operator cannot accomplish a function as a network operator because of the occurrence of a fault or the like in the contract network operator.

For example, as shown in FIG. 4, contract network operator identification information "network operator A" and availability/unavailability information "available" are stored in association with each other. This shows that a contract network operator shown as "network operator A" by contract network operator identification information acquired from a service operator is currently available.

Contract network operator identification information "network operator D" and availability/unavailability information "unavailable" are stored in association with each other. This shows that a contract network operator shown as "network operator D" by the contract network operator identification information acquired from the service operator is currently unavailable.

Contract network operator identification information "network operator E" and availability/unavailability information "available" are stored in association with each other. This shows that a contract network operator shown as "network operator E" by the contract network operator identification information acquired from the service operator is currently available.

Contract network operator identification information "network operator F" and availability/unavailability information "available" are stored in association with each other. This shows that a contract network operator shown as "network operator F" by the contract network operator identification information acquired from the service operator is currently available.

Contract network operator identification information "network operator G" and availability/unavailability information "unavailable" are stored in association with each other. This shows that a contract network operator shown as "network operator G" by the contract network operator identification information acquired from the service operator is currently unavailable.

Contract network operator identification information "network operator I" and availability/unavailability information "available" are stored in association with each other. This shows that a contract network operator shown as "network operator I" by the contract network operator identification information acquired from the service operator is currently available.

Operator search section 130 searches for network operators covering the communicable range of mobile communication terminal 100.

Comparison section 140 compares network operator identification information showing the network operators retrieved by operator search section 130 with contract network operator identification information based on which availability/unavailability information shows "available", from among the contract network operator identification information acquired by contract operator information acquisition section 110. At this time, comparison section 140 compares the network operator identification information showing the network operators retrieved by operator search section 130 with contract network operator identification information based on which availability/unavailability information shows "available", from among the contract network operator identification information stored in storage section 120.

Display section 150 is a display that displays matching network operator identification information as a result of the comparison by comparison section 140.

A network display method in the present exemplary embodiment will be described below.

Figure 5:
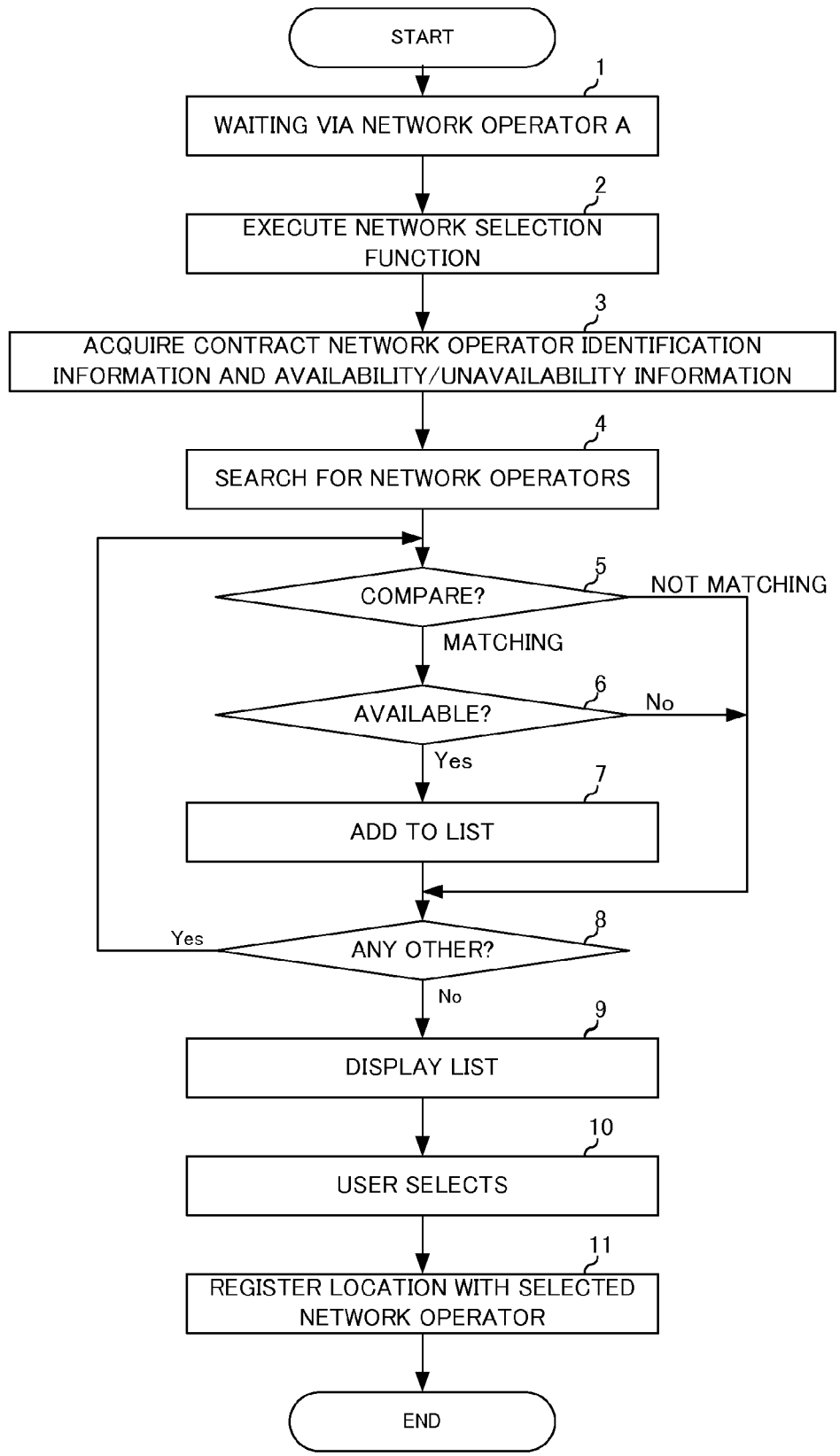
FIG. 5 is a flowchart for illustrating a network display method in the present exemplary embodiment.

FIG. 5 is a flowchart for illustrating the network display method in the present exemplary embodiment.

First, when, in a state in which mobile communication terminal 100 is waiting via network operator A at step 1, a network selection function is activated (executed) by a user operating mobile communication terminal 100 at step 2, the latest contract network operator identification information about contract network operators who have a roaming contract with the service operator and availability/unavailability information about the contract network operators are acquired from the Web page or the like of service operator 200 by contract operator information acquisition section 110 at step 3. The acquired contract network operator identification information and availability/unavailability information, that are associated with each other, are stored into storage section 120. For example, the association shown in FIG. 4 is stored.

At step 4, network search is performed by operator search section 130, and network operators covering the communicable range of mobile communication terminal 100 are retrieved. For example, it is assumed that network operators A to I are retrieved.

Then, at step 5, identification information about the network operators retrieved by operator search section 130 and the contract network operator identification information stored in storage section 120 are compared by comparison section 140 for each network operator.

If the identification information about a network operator retrieved by operator search section 130 matches contract network operator identification information stored in storage section 120 as a result of the comparison by comparison section 140, it is judged at step 6 whether or not the network operator is available. More specifically, if availability/unavailability information stored in storage section 120 and that is associated with the matching contract network operator identification information is "available", it is judged that the network operator is available. On the other hand, if the availability/unavailability information stored in storage section 120 and that is associated with the matching contract network operator identification information is "unavailable", it is judged that the network operator is unavailable.

If the network operator is judged to be available at step 6, the network operator identification information about the network operator is added to a list to be displayed, at step 7. At this time, the network operator identification information may be added together with the radio connection technology of the network operator.

Then, it is judged at step 8 whether there is any other network operator retrieved by operator search section 130. If it is judged that there is such a network operator, the process of step 5 is performed for the next network operator. That is, if network operators A to I are retrieved, the process from steps 5 to 7 is performed for all of network operators A to I.

If it is judged at step 5 that identification information about a network operator retrieved by operator search section 130 does not match contract network operator identification information stored in storage section 120, the process of step 8 is performed. That is, if a network operator retrieved by operator search section 130 is not a contract network operator, the network operator is not included in the list to be displayed.

In the case where the network operator (the contract network operator) is judged to be unavailable at step 6 also, the process of step 8 is performed. That is, if a contract network operator is judged to be unavailable, the contract network operator is not included in the list to be displayed.

When the process from steps 5 to 7 has been performed for all of network operators A to I, a list is displayed on display section 150 at step 9.

FIG. 6 is a diagram showing an example of the list displayed on display section 150 shown in FIG. 3 at step 9.

By the process of step 9, identification information about available contract network operators is displayed as a list on display section 150 shown in FIG. 3, as shown in FIG. 6. In the example shown in FIG. 6, it is shown that network operator A, network operator E, network operator F and network operator I are available contract network operators. The network operators may be displayed together with their respective radio connection technologies, as shown in FIG. 6.

When, after the list of the available contract network operators is displayed on display section 150, the desired network operator is selected from among the displayed network operators by a predetermined operation being performed by the user at step 10, a location registration process of mobile communication terminal 100 is performed for the selected network operator at step 11.

Availability/unavailability information may be added to the list without performing the process of step 6 described above.

FIG. 7 is a diagram showing another example of the list displayed on display section 150 shown in FIG. 3 at step 9.

By the process of step 9, the identification information about contract network operators and the availability/unavailability information, that are associated with each other, are displayed as a list on display section 150 shown in FIG. 3, as shown in FIG. 7. In the example shown in FIG. 7, it is shown that network operator A, network operator D, network operator E, network operator F, network operator G and network operator I are contract network operators; network operator A is available; network operator D is unavailable; network operator E is available; network operator F is available; network operator G is unavailable; and network operator I is available. The network operators may be displayed together with their respective radio connection technologies as shown in FIG. 7.

In the process described above, description has been made of a case in which roaming information (contract network operator identification information) and network fault information (availability/unavailability information) are acquired from the Web page of a service operator as an example. However, a service operator may provide the information by periodically updating and notifying the information or the information may be inquired through the use of a contactless IC card function.

For example, in the case of using the contactless IC card function, an electronic ticket is brought into contact with a gate which serves as a predetermined communication apparatus through which individuals who depart a country from an airport must pass. At the time of bringing the electronic ticket into contact with the gate, limited information, such as a destination and network operators around the destination, may be acquired on the basis of information that is electronically written in the electronic ticket.

As described above, information about network operators with which a location can be registered is obtained from service operator 200, and only information about the network operators with which a location can be registered (which is connectable) is displayed on display section 150 provided on mobile communication terminal 100 as a network search result. Thereby, it is possible to solve the problem in which a user selects a network operator with which a location cannot be registered, fails in a location registration process and has to select another network operator again.

The above-described processes performed by the components provided for mobile communication terminal 100 may be performed by logic circuits prepared according to purposes, respectively. It is also possible to record a computer program in which process contents are written as a procedure (hereinafter referred to as a program) in a recording medium which can be read by mobile communication terminal 100 and causes mobile communication terminal 100 to read and execute the program recorded in the recording medium. The recording medium which can be read by mobile communication terminal 100 refers to a memory such as a ROM and a RAM, an HDD and the like included in mobile communication terminal 100, in addition to removable recording media, such as a floppy (R) disk, a magneto-optical disk, a DVD and a CD. The program recorded in the recording medium is read by a CPU (not shown) provided in mobile communication terminal 100, and a process similar to that described above is performed under the control of the CPU. Here, the CPU operates as a computer that executes the program read from the recording medium in which the program is recorded.

The present invention has been described above with reference to an exemplary embodiment. The present invention, however, is not limited to the exemplary embodiment described above. Various modifications understandable by one skilled in the art can be made to the configuration and details of the present invention within the scope of the present invention.

This application claims priority based on Japanese Patent Application No. 2010-248792 filed on Nov. 5, 2010, the disclosure of which is hereby incorporated by reference thereto in its entirety.

The invention claimed is:

1. A mobile communication terminal comprising:
   a contract operator information acquisition section that acquires, from a service operator with whom the mobile communication terminal has a communication contract, contract network operator identification information indicating contract network operators that are network operators with whom the service operator has a roaming contract and availability/unavailability information indicating whether or not the contract network operators are available;
   an operator search section that searches for the network operators;
   a comparison section that compares network operator identification information showing indicating the network operators retrieved by said operator search section with contract network operator identification information which the availability/unavailability information shows available, from among the contract network operator identification information acquired by said contract operator information acquisition section; and
   a display section that displays matching network operator identification information as a result of the comparison by said comparison section, wherein
   said contract operator information acquisition section acquires the contract network operator identification information and the availability/unavailability information from a predetermined communication apparatus using a contactless Integrated Circuit (IC) card function.

2. The mobile communication terminal according to claim 1, comprising:
   a storage section that stores the contract network operator identification information and the availability/unavailability information acquired by said contract operator information acquisition section, and that associates the pieces of information with each other; wherein said comparison section compares the network operator identification information indicating the network operators retrieved by said operator search section with contract network operator identification information which the availability/unavailability information shows available, from among the contract network operator identification information stored in said storage section.

3. The mobile communication terminal according to claim 1, wherein said contract operator information acquisition section periodically acquires the contract network operator identification information and the availability/unavailability information from the service operator.

4. The mobile communication terminal according to claim 1, wherein said contract operator information acquisition section acquires the contract network operator identification information and the availability/unavailability information from a Web page of the service operator.

5. A network display method for displaying a network with which a mobile communication terminal is capable of registering a location, the method comprising the steps of:

acquiring, from a service operator with whom the mobile communication terminal has a communication contract, contract network operator identification information indicating contract network operators who are network operators with whom the service operator has a roaming contract and availability/unavailability information indicating whether or not the contract network operators are available;

searching for the network operators;

comparing network operator identification information indicating the retrieved network operators with contract network operator identification information which the availability/unavailability information shows available, from among the acquired contract network operator identification information; and displaying matching network operator identification information as a result of the comparison, wherein said acquiring further includes acquiring the contract network operator identification information and the availability/unavailability information from a predetermined communication apparatus using a contactless Integrated Circuit (IC) card function.

* * * * *

UNITED STATES PATENT AND TRADEMARK OFFICE
CERTIFICATE OF CORRECTION

| | |
|---|---|
| PATENT NO. | : 9,020,500 B2 |
| APPLICATION NO. | : 13/882310 |
| DATED | : April 28, 2015 |
| INVENTOR(S) | : Kousuke Somekawa |

It is certified that error appears in the above-identified patent and that said Letters Patent is hereby corrected as shown below:

IN THE CLAIMS

Column 8, Line 46: In Claim 1, after "information" delete "showing"

Signed and Sealed this
Twenty-fourth Day of November, 2015

Michelle K. Lee
*Director of the United States Patent and Trademark Office*